United States Patent [19]
Yonezu

[11] 3,906,476
[45] Sept. 16, 1975

[54] WARNING SYSTEM
[75] Inventor: Hisashi Yonezu, Oobu, Japan
[73] Assignee: Nippondenso Co., Ltd., Kariya, Japan
[22] Filed: Aug. 17, 1973
[21] Appl. No.: 389,156

[30] Foreign Application Priority Data
Aug. 21, 1972 Japan.............................. 47-83450
Feb. 6, 1973 Japan.............................. 48-15291
May 10, 1973 Japan.............................. 48-52193

[52] U.S. Cl............ 340/253 R; 340/52 C; 335/153; 317/155
[51] Int. Cl.² ...................... G08B 21/00; B60Q 1/00
[58] Field of Search .... 340/52 R, 52 A, 52 B, 52 C, 340/253 R, 248 R, 332; 317/155; 335/151, 153

[56] References Cited
UNITED STATES PATENTS

| | | | |
|---|---|---|---|
| 2,434,433 | 1/1948 | Ray..................................... | 317/155 |
| 2,463,470 | 3/1949 | Sherwood........................... | 317/155 |
| 2,669,664 | 2/1954 | Poznik................................. | 317/155 |
| 2,814,740 | 11/1957 | Smith.................................. | 317/155 |
| 3,020,369 | 2/1962 | Jacobson ............................ | 335/153 |
| 3,283,273 | 11/1966 | Pearse................................. | 335/153 |
| 3,284,741 | 11/1966 | Conklin .............................. | 335/153 |
| 3,364,449 | 1/1968 | Gould.................................. | 335/153 |
| 3,387,185 | 6/1968 | Pearse................................. | 335/153 |
| 3,622,972 | 11/1971 | Herceg............................... | 340/52 C |
| 3,736,467 | 5/1973 | Meier.................................. | 317/155 |

Primary Examiner—Thomas B. Habecker
Attorney, Agent, or Firm—Cushman, Darby & Cushman

[57] ABSTRACT

There is provided a warning system comprising a first coil, a second coil for producing a magnetic field whose direction is opposite to that of the magnetic field by the first coil, and a reed switch system having contacts which are opened and closed by the magnetomotive forces of the coils and which, once closed, are held in the closed position, whereby the contacts of the reed switch system are closed by the closing of a switch for detecting a fault in a system subject to fault detection to give a warning to the operator and moreover even when a power supply switch which has once been turned off is closed again, the contacts are held in the closed position so far as the fault has not been removed. Thus, the warning system of this invention is highly reliable.

8 Claims, 5 Drawing Figures 3,906,476

WARNING SYSTEM

BACKGROUND OF THE INVENTION

1. Field Of The Invention

The present invention relates to a warning system which is mainly used as a low braking hydraulic pressure warning system for automobiles. Of course, the warning system of this invention may be used to warn for example a fault in a lamp and it has a very wide application.

2. Description Of The Prior Art

Low braking hydraulic pressure warning systems for automobiles are known in the art in which the braking hydraulic pressure is detected so that a warning is given by the indication of a lamp or the like when the braking action fails to increase the hydraulic pressure. A disadvantage of the conventional systems of this type is that since no history of the fault is retained, there is the danger of the operator overlooking the existence of the fault until the brakes are reapplied. Warning systems of another type are known in the art in which in order to avoid the aforesaid danger, once a warning has been given, this warning is automatically held by an electric means. A disadvantage of this type of warning system is that the intended self-holding action is lost when the ignition switch is turned off with the result that when the ignition switch is turned on again, no warning is given as thoguh the fault has been removed and this gives rise to an extremely dangerous situation. In order to eliminate these inconveniences, it is necessary that once a fault has been found, the fault is remembered until it has been removed.

SUMMARY OF THE INVENTION

It is an object of the present invention to provide a warning system which requires a reduced number of component parts, is inexpensive to manufacture and comprises a reed switch system having contacts that are opened and closed by the magnetomotive forces of electromagnetic coils and that, once closed, are retained in the closed position, a hydraulic pressure switch that is opened and closed in response to the hydraulic pressure in a braking system, and a warning means that comes into operation when the reed switch is closed upon detection of an insufficient hydraulic pressure in the braking system by the hydraulic pressure switch, wherein the electromagnetic coils comprise a first coil for producing a magnetic field sufficient to close the reed switch and a second coil for producing a magnetic field whose direction is opposite to that of the magnetic field by the first coil, and at least one of the first and second coils is connected to the hydraulic pressure switch, whereby a warning is given upon detection of a fault in the hydraulic braking system and the warning is given independently of the opening and closing of an ignition switch until the fault has been removed.

Further, the system according to the present invention has among its great advantages the fact that it is inexpensive to manufacture by virtue of its simple construction comprising a combination of a reed relay and a magnet and moreover the use of the reed switch(s) has the effect of making the system small and lighter, highly resistant against shock and vibration and highly reliable in operation.

DESCRIPTION OF THE PREFERRED EMBODIMENTS

The present invention will now be explained in greater detail with reference to the illustrated embodiments.

Figure 1:
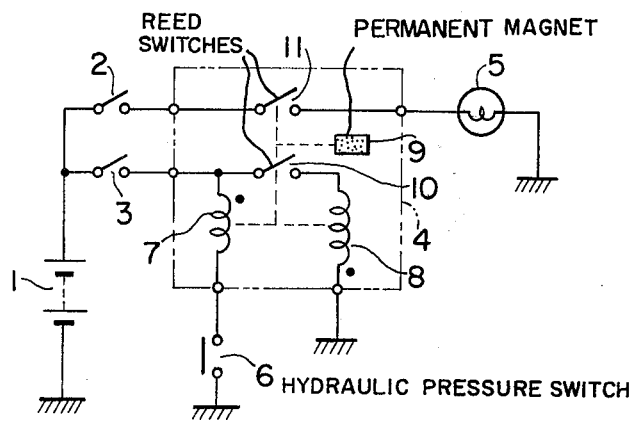
FIG. 1 is an electric wiring diagram showing an embodiment of a warning system according to the present invention.
Figure 2:
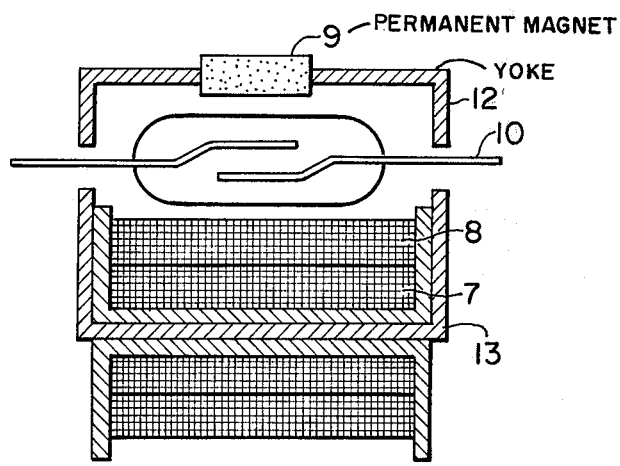
FIG. 2 is a sectional view showing the structure of the reed relay section in the system shown in FIG. 1.

Referring first to FIGS. 1 and 2, numeral 1 designates a battery installed in an automobile, 2 an ignition switch, 3 a brake switch which is closed upon depression of a brake pedal that is not shown. Numeral 4 designates the relay circuit section of a warning system according to this invention, 5 a warning lamp controlled by the relay circuit section 4 with the warning lamp mounted on the instrument panel in the front part of the driver's compartment. The warning lamp 5 serves only as an example of the warning means usable with the warning system of this invention and therefore it may of course be replaced with a buzzer, for example. Numeral 6 designates a hydraulic pressure switch which is closed when the hydraulic pressure in the automobile hydraulic braking sustem becomes lower than a predetermined value. Numerals 7 and 8 designate a first and second electromagnetic coil which are wound in such a manner that the magnetomotive forces of the coils oppose each other. Numeral 9 designates a permanent magnet whose magnetomotive force is not sufficient to close reed switches 10 and 11 but sufficient to hold the closed reed switches 10 and 11 in the closed position. The direction of the magnetomotive force of the permanent magnet 9 is the same as that of the magnetomotive force of the first electromagnetic coil 7. The magnetomotive forces of the first and second electromagnetic coils 7 and 8 are selected so that each of the coils can close the reed switches 10 and 11 with its own magnetomotive force alone. Numerals 12 and 13 designate yokes constituting a magnetic circuit, and the yoke 12 may be eliminated depending on the size of the permanent magnet 9.

While, in FIG. 2, only the reed switch 10 is shown and the reed switch 11 is omitted, the reed switch 11 constitutes the identical magnetic circuit with that of the reed switch 10, and the reed switches 10 and 11 are juxtaposed between the yokes 12 and 13. As will be seen from FIG. 2, the reed switches 10 and 11, the first and second electromagnetic coils 7 and 8 and the permanent magnet 9 constitute a reed relay.

With the construction described above, the first embodiment of the invention operates as follows. With the ignition switch 2 in the closed position, if the closing of the brake switch 3 does not increase the hydraulic pressure due to a fault in the hydraulic braking system, the hydraulic pressure switch 6 remains in the closed position. As a result, the first electromagnetic coil 7 is energized through the brake switch 3 and the hydraulic pressure switch 6, producing a magnetomotive force and thus closing the reed switches 10 and 11. When this occurs, the warning lamp 5 is energized and turned on from the battery 1 through the ignition switch 2 and the reed switch 11, thereby giving warning that there is the fault in the hydraulic braking system. At the same time, the second electromagnetic coil 8 is energized through the reed switch 10 so that the magnetomotive forces of the first and second electromagnetic coils 7 and 8 cancel each other. In this case, however, the reed switches 10 and 11 are held in the closed position by the magnetomotive force of the permanent magnet 9. This action is maintained independently of the opening and closing of the ignition switch 2. Consequently, when the ignition switch 2 is closed again after it has been opened, the warning lamp 5 is immediately turned on to warn of the fault.

When the fault in the hydraulic braking system has been removed, the closing of the brake switch 3 increases the hydraulic pressure to a predetermined value and hence the hydraulic pressure switch 6 is opened. Consequently, the first electromagnetic coil 7 is not energized. On the other hand, the second electromagnetic coil 8 is energized through the reed switch 10, producing a magnetomotive force whose direction is opposite to that of the magnetomotive force of the permanent magnet 9. As a result, the reed switches 10 and 11 are released from the magnetomotive force of the permanent magnet 9 and returned to the open position, so that the warning lamp 5 is turned off and at the same time the second electromagnetic coil 8 is deenergized.

While, in the embodiment described above, the present invention has been embodied in a low hydraulic pressure warning system for the hydraulic braking system, the present invention is also useful to warn of a fault in the head light, brake lamp or the like. Such a lamp fault warning system may be obtained by substituting, in the above-described embodiment, a lamp lighting switch for the brake switch 3 and the contacts of a fault detecting relay for the hydraulic pressure switch 6.

Figure 3:
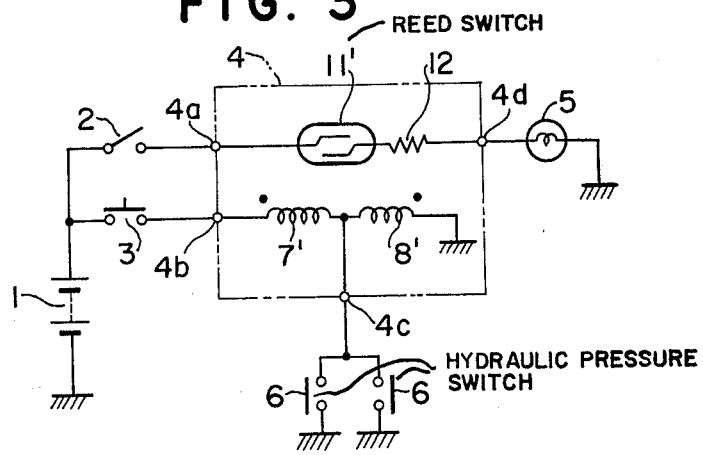
FIG. 3 is an electric wiring diagram showing another embodiment of the warning system according to the present invention.

Next, the second embodiment shown in FIG. 3 will be described. In FIG. 3, numeral 1 is the battery, 2 the ignition switch, 3 the brake switch, 4 a warning circuit, 5 the warning lamp, 6 the hydraulic pressure switch. When the depression of the brake pedal fails to increase the hydraulic pressure, that is, when there is a fault, the hydraulic pressure switch 6 is not opened. Numeral 11' designates a self-holding reed switch designed so that once its contacts have been closed by the application of an external magnetic field, the switch automatically remains in the closed position even after the removal of the external magnetic field. Numeral 12 designates a protective resistor. A first coil 7' and a second coil 8' are connected in series, with the other end of the first coil 7' connected to the brake switch 3 through a terminal 4b and the other end of the coil 8' grounded. The junction point of the first and second coils 7' and 8' is connected to the hydraulic pressure switch 6 through a terminal 4c. The first and second coils 7' and 8' are wound to produce magnetomotive forces which are opposite in direction to each other. The first and second coils 7' and 8' and the reed switch 11' constitute a reed switch section which may for example have a sectional structure as shown in FIG. 2.

In operation, when the brake switch 3 is closed and the hydraulic pressure switch 6 is not closed, that is, when the braking hydraulic pressure is normal, current flows through the first and second coils 7' and 8' and the opposing magnetomotive forces of the coils cancel each other. In this case, the magnetomotive force of the second coil 8' is designed greater than that of the first coil 7'. In other words, the value of the difference magnetomotive force is smaller than the starting ampere-turns of the reed switch 11' but greater than the self-holding action releasing ampere-turns. Accordingly, if the reed switch 11' is closed by any chance, the difference in magnetomotive force between the first and second coils 7' and 8' causes the reed switch 11' to open. When the reed switch 11 is not closed, there is no change in the position of the reed switch 11'. On the other hand, when there is a fault in the hydraulic braking system so that the hydraulic pressure switch 6 remains closed despite the fact that the brake switch 3 has been closed, the second coil 8' is short-circuited by the hydraulic pressure switch 6 and therefore the reed switch 11' is closed by the magnetomotive force of the first coil 7'. At this time, if the ignition switch 2 has been closed, current flows to the warning lamp 5 from the battery 1 through the resistor 12 and the warning lamp 5 is turned on. Once the warning lamp 5 has been turned on, even if either the power supply is disconnected or the brake switch 3 is opened, the reed switch 11' remains in the closed position since it is self-holding type. In other words, it remembers that the fault has occurred. When the brake switch 3 is closed after the removal of the fault so that the hydraulic pressure switch 6 is opened, as previously mentioned, current flows throuth the first and second coils 7' and 8' and thus the back ampere-turns of the second coil 8' cause the reed pieces of the reed switch 11' repel and separate from each other. Consequently, the warning lamp 5 is turned off.

Figure 4:
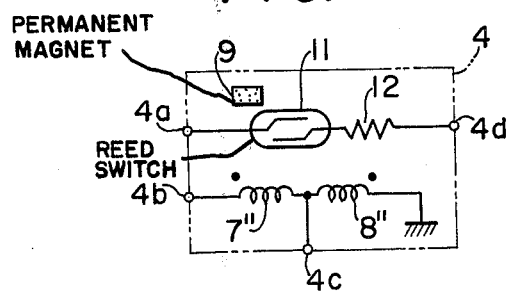
FIG. 4 is a circuit diagram showing a modification of the warning circuit section of the circuitry shown in FIG. 3.

In FIG. 4 showing a modification of the warning circuit section of the embodiment shown in FIG. 3, the reed switch 11 consists of an ordinary reed switch and it is provided with a self-holding function by virtue of the magnetomotive force of the permanent magnet 9. Coils 7'' and 8'' correspond to the first and second coils 7' and 8' in the embodiment of FIG. 3 and their functions are substantially the same with those of the latter excepting that they have somewhat different design values.

Figure 5:
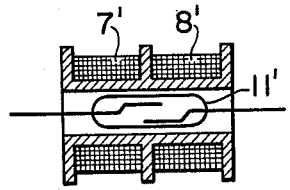
FIG. 5 is a sectional view showing the mechanical structure of the reed switch section in the embodiment shown in FIG. 3.

FIG. 5 shows the construction of a modification of the reed switch section of the embodiment shown in FIG. 3. In this modification, the magnetomotive forces of the first and second coils 7' and 8' are selected to have substantially the same value. The operation of this modified reed switch section is substantially the same as that of the reed switch section in the embodiment of FIG. 3 excepting that instead of opening the closed reed switch by means of the back ampere-turns of the coil, the reed pieces of the reed switch are magnetized by the first and second coils 7' and 8' to induce therein the same magnetic poles, e.g., the north poles to thereby open the reed switch.

I claim:

1. A warning system comprising a self-holding type reed switch having contacts which close upon application of an external magnetic field and which are retained in said closed position even after the removal of said external magnetic field, a first coil for producing a magnetic field sufficient to close said reed switch, a second coil for producing a magnetic field whose direction is opposite to that of the magnetic field of said first coil wherein the strength of the resultant magnetic field of the magnetic fields of the first and second coils is not sufficient to close said reed switch when in the open position, but is sufficient to open said reed switch when in the closed position, a sensor switch means connected to a power supply through said first coil which senses a fault condition, and a warning means connected to said reed switch.

2. A warning system according to claim 1, wherein said first and second coils are connected in series with each other, and wherein one end of said second coil is grounded.

3. A warning system according to claim *1* further including a protective resistor for said reed switch.

4. A warning system according to claim 1, wherein said self-holding type reed switch comprises an ordinary reed switch, and a permanent magnet for holding said ordinary reed switch in the closed position thereof.

5. A warning system comprising a self-holding type reed switch having contacts which close upon application of an external magnetic field thereto and which are retained in said closed position even after the removal of said external magnetic field, a first coil for producing a magnetic field sufficient to close said reed switch, a second coil for producing a magnetic field whose direction is opposite to that of the magnetic field of said first coil and whose strength is substantially the same as that of the magnetic field of said first coil, said first and second coils being wound independently of each other on both sides of the central portion of said reed switch, a power supply, a sensor switch means connected to said power supply through said first coil which senses a fault condition, and a warning means connected to said reed switch.

6. A warning system according to claim 5, wherein said first and second coils are connected in series with each other, and wherein one end of said second coil is grounded.

7. A warning system according to claim 5 further including a protective resistor for said reed switch.

8. A warning system comprising in combination:

A pair of electromagnetic coils mounted to produce magnetomotive forces opposing one another, a reed switch having at least a pair of contacts, said contacts being opened and closed in response to the electromotive forces of said electromagnetic coils, means for energizing said coils, said means including a switch connected to at least one of said coils and being actuated in response to a fault condition to energize only one of said coils to generate an electromotive force for closing said reed contacts, said contacts remaining closed until the removal of said fault, and warning means responsive to the close of said contacts for providing a warning upon the energization thereof.

* * * * *